United States Patent
Wang et al.

(10) Patent No.: US 9,564,654 B2
(45) Date of Patent: *Feb. 7, 2017

(54) RECHARGEABLE LITHIUM ION BUTTON CELL BATTERY

(71) Applicant: Zhuhai Zhi Li Battery Co. Ltd., Zhuhai, Guangdong (CN)

(72) Inventors: Fang Wang, Guangdong (CN); Fajiong Sun, Guangdong (CN); Youqing Yang, Guangdong (CN); Zui Yang, Guangdong (CN); Zhen Li, Guangdong (CN)

(73) Assignee: Zhuhai Zhi Li Battery Co. Ltd., Zhuhai, Guangdong (CN)

( * ) Notice: Subject to any disclaimer, the term of this patent is extended or adjusted under 35 U.S.C. 154(b) by 286 days.

This patent is subject to a terminal disclaimer.

(21) Appl. No.: 13/867,031

(22) Filed: Apr. 19, 2013

(65) Prior Publication Data

US 2014/0315061 A1 Oct. 23, 2014

Related U.S. Application Data

(63) Continuation-in-part of application No. 12/881,179, filed on Sep. 14, 2010, now Pat. No. 8,993,148.

(51) Int. Cl.
| | |
|---|---|
| *H01M 4/00* | (2006.01) |
| *H01M 10/04* | (2006.01) |
| *H01M 2/02* | (2006.01) |
| *H01M 2/26* | (2006.01) |
| *H01M 10/0525* | (2010.01) |
| *H01M 10/0587* | (2010.01) |
| *H01M 2/04* | (2006.01) |

(52) U.S. Cl.
CPC ....... *H01M 10/0431* (2013.01); *H01M 2/0222* (2013.01); *H01M 2/0413* (2013.01); *H01M 2/263* (2013.01); *H01M 10/0525* (2013.01); *H01M 10/0587* (2013.01); *Y02E 60/122* (2013.01)

(58) Field of Classification Search
CPC ............ H01M 10/0587; H01M 2/0222; H01M 2/1686
USPC ................................................... 429/94, 157
See application file for complete search history.

(56) References Cited

U.S. PATENT DOCUMENTS

| | | | | |
|---|---|---|---|---|
| 7,575,830 | B2 * | 8/2009 | Kawamura et al. | 429/218.1 |
| 8,734,996 | B2 * | 5/2014 | Feng et al. | 429/231.8 |
| 8,771,882 | B2 * | 7/2014 | Sato et al. | 429/323 |
| 8,993,148 | B2 * | 3/2015 | Wang et al. | 429/157 |

(Continued)

*Primary Examiner* — Nina Bhat (57) ABSTRACT

A rechargeable lithium ion button cell battery having a sealed housing comprises an inner casing and an outer casing, both casings have at least one flat area as top or bottom of the battery, and a round or oval sidewall vertically formed to the flat area. An insulation gasket is positioned between the sidewalls, and the outer casing opening is mechanically crimped to complete the seal of the battery. Inside the sealed housing the anode and cathode electrodes are spiral wound with separator to be a round or oval roll. A roll axis is vertical to the flat area of the casings. The two electrodes are tapered in width to fully utilize the inner space. The electrodes comprise current collectors of metal foils coated with lithium-intercalating active materials, leaving small area of uncoated metal foils as conductor tabs for connecting the electrodes to the casings.

24 Claims, 6 Drawing Sheets

(56) References Cited

U.S. PATENT DOCUMENTS

| | | | |
|---|---|---|---|
| 2006/0234123 A1* | 10/2006 | Vallee et al. | 429/231.1 |
| 2009/0246625 A1* | 10/2009 | Lu | 429/207 |
| 2011/0229774 A1* | 9/2011 | Yamaki | 429/338 |
| 2012/0235644 A1* | 9/2012 | Gordon et al. | 320/127 |

* cited by examiner

RECHARGEABLE LITHIUM ION BUTTON CELL BATTERY

RELATED APPLICATION

This application is a Continuation-in-Part of U.S. patent application Ser. No. 12/881,179 filed Sep. 14, 2010, now U.S. Pat. No. 8,993,148, published on Apr. 21, 2011 incorporated by reference in its entirety.

REFERENCES CITED

| | | | | |
|---|---|---|---|---|
| U.S. patent DOCUMENTS | | | | |
| 5,427,874 | May 1994 | Sugeno | 429/194 | Non-aqueous liquid electrolyte secondary cell |
| 5,582,930 | May 1995 | Oltman et al. | 429/27 | High energy density metal-air cell |
| 5,629,107 | January 1996 | Shioda et al. | 429/128 | Coin-shaped lithium battery |
| 6,248,476 | June 1999 | Sun et al. | 429/224 | Metal air cathode and electrochemical cells made therewith |
| 6,265,100 | February 1998 | Saaski et al. | 429/163 | Rechargeable battery |
| 6,451,472 | April 2000 | Chang et al. | 429/94 | Lithium battery and manufacturing method thereof |
| 6,567,527 | August 2000 | Baker et al. | 381/323 | Elongated oval battery assembly for canal hearing device |
| 6,713,215 | January 2001 | Watanabe et al. | 429/231.5 | Non-aqueous electrolyte rechargeable batteries |
| 6,761,995 | August 2001 | Uyama et al. | 429/171 | Coin-shaped battery |
| 6,794,082 | September 2001 | Mori et al. | 429/174 | Alkaline battery |
| 6,984,468 | January 2004 | Rubino et al. | 429/174 | Hermetically sealed coin cell |
| 7,276,092 | March 2004 | Holl et al. | 29/623.2 | Electrochemical element in the form of a button cell, and a method for producing an electrochemical element |
| 7,348,102 | March 2005 | Li et al. | 429/233 | Corrosion protection using carbon coated electron collector for lithium-ion battery with molten salt electrolyte |
| U.S. patent applications | | | | |
| 12/881,179 | September 2010 | Wang et al. | 429/94 | Rechargeable lithium ion button cell battery |
| 13/378,117 | December 2011 | Gaugler | 429/94 | Button cell having winding electrode and method for the production thereof |

FIELD OF INVENTION

This invention relates to rechargeable lithium-ion electrochemical battery, and more particularly to a very small size lithium-ion battery used in small electronic devices such as hearing aids, earphones or watches, in a shape of coin or button like, commonly known as rechargeable lithium-ion button cell battery.

BACKGROUND OF THE INVENTION

Rechargeable lithium-ion and lithium-polymer batteries are used widely for portable electronics like cell phone and earphones. For extremely small applications like hearing aids, volumetric energy density is the key consideration. In U.S. patent application Ser. No. 12/881,179 published on Apr. 21, 2011 Pub. No. US 2011/0091753A1 by Wang et al. a novel button cell configuration with spiral wound electrodes was provided which has great advantages on volumetric energy density over lithium-polymer battery or stacked electrodes button cell. Detailed comparisons of different prior arts were described in that patent.

In U.S. patent application Ser. No. 12/881,179 the electrodes are tapered in width to adapt to the height changes in the battery inner casing which leaves a shoulder for the outer casing and insulation gasket to be crimped on to form a reliable sealing. The electrodes comprise current collectors of metal foils coated with lithium-intercalating active materials, leaving small area of uncoated metal foils as conductor tabs for connecting to the casings. The tabs are welded to the casings respectively, or for the tab of the electrode which connecting to outer casing, welded to an aluminum flake first and said flake is pressed on the outer casing by said gasket. The tab connecting to the outer casing will need to be welded to a metal flake first, or, by extending its length, to be welded directly to the flat inner surface of the outer casing. Both methods need much care and as the tab comprising copper or aluminum foil is very thin, usually the thickness is just 0.006 mm to 0.016 mm, most probably at 0.012 mm of aluminum, they are easy to be broken during the welding process and/or cell assembly steps hence the cell would fail.

In above patent the insulation washers are also used to cover the inner surface of the casings to prevent battery short. However, as the tab connecting to the outer casing is in a complicated way, so to fully cover the metal flake by one washer is difficult. Exposing to the electrolyte of the naked metal on the cathode casing or naked metal connected to the cathode casing—usually the outer casing—is found to be one of the causes for battery short and/or shorter cycle life.

In U.S. patent application Ser. No. 13/378,117 published on Apr. 26, 2012 Pub. No. US 2012/0100406A1 by Gaugler, spiral wound electrodes were also used but without taper on width. It has no mechanical crimping to seal the battery just press the outer casing horizontally on the gasket and inner casing. Such design does not have closing force on the vertical direction of the cell. The electrodes are firstly welded with conductors and then the conductors are welded to the casings by laser from the outside of the cell, after the cell is closed. It is a bold design while the reliability of such configuration is in question.

Therefore, it is the object of the present invention to provide an easier and reliable connecting method for the electrodes to be connected to the battery casings.

It is another object of the present invention to provide a better method to prevent the cell from short circuit, covering all the naked metals at cathode tab and cathode casing not to be exposed to electrolyte, hence the battery will have high reliability and longer cycle life.

SUMMARY OF THE INVENTION

The objects of the present invention are attained in an electrochemical rechargeable lithium-ion button cell battery briefly described below:

A sealed housing comprises an inner casing and an outer casing, both casings having at least one small flat area as top or bottom of the battery, and a round or oval sidewall vertically formed to the flat area. The inner casing has a shoulder on the rim of the flat top area connecting its flat top area to the sidewall. An insulation gasket is positioned between said inner casing and said outer casing sidewalls, and the outer casing opening rim is mechanically crimped to press the gasket firmly on the inner casing shoulder to complete the seal of the battery.

Inside the sealed housing the anode & cathode electrodes are spiral wound with separator to be a round or oval roll. Said roll axis is vertical to the flat area of the casing top and bottom, and parallel to the casing sidewalls. The electrodes are tapered in width, to adapt the inner space height changes from the center of the casing to the shoulder rim. The two electrodes comprise current collectors of metal foils coated with lithium-intercalating active materials. Commonly the anode current collector is copper foil, the cathode current collector is aluminum foil. The foils are not fully coated with active materials leaving small areas on the electrodes uncoated, and these areas act as conductor tabs connecting the electrodes to the battery casings respectively. As the foils are thin, usually at thickness of 0.006 mm to 0.016 mm, they are easy to be broken. So to at least double folding or even triple folding the conductor tabs could significantly improve the reliability of such connecting.

The anode copper tab is designed at the wider end of the tapered anode electrode, and welded to the anode casing which is the inner casing at its center. The cathode aluminum tab is designed at the narrower end of the tapered cathode electrode, for the convenience of electrodes manufacturing and battery assembly. These two tabs can also be at any position of the electrodes not just at the ends. They can also be made by a second party metal sheet or foil welded to the current collectors of the electrodes. The aluminum and copper conductor tabs are partially covered with several small pieces of insulation tapes on theirs area wherein not welded or not contacting the metal casings. Another insulation washer could be applied to the inner top surfaces of the inner casing. It is O ring shape, leaving a hole at the center for the welding of one electrode conductor tab to the inner casing, usually anode tab and anode casing. The washer and washers and insulation tapes described above could prevent short circuit between the edges of wound electrodes and the casings, and also could enable the battery to have longer cycle life.

The cathode tab could be connected to the cathode casing which is the outer casing in three options:

The first option and most preferred, is to have the cathode conductor tab to be firstly bended outward away from the spiral wound roll, across the insulation gasket from its footing rim, and then bended upward, along the outer sidewall of the insulation gasket, to about ⅕ to ⅘ of its full height, to have enough contacting area for the tab and cathode casing, while still leave room for the gasket to contact the cathode casing directly for a reliable seal. When the battery is closed, such out-up-bended conductor tab is squeezed between the sidewalls of the cathode casing and the insulation gasket by the mechanical closing force to have the conductor tab to contact the outer casing very tightly for a good conducting of the electrons during charge and discharge. A round insulation washer could be applied on the inner surface of the flat area of the outer casing and it covers the cathode casing metal completely from exposing to the electrolyte.

The other option is to weld the cathode tab to an aluminum round flake, and said flake be pressed by said battery gasket upon the outer casing bottom to have reliable contact with the outer casing. This option uses quite small tab to be welded easily on the aluminum flake. Further insulation washer or washers could be applied on the welded aluminum flake surface to prevent any metal from exposing to the electrolyte, to reduce the risk of battery short and also have longer cycle life. One washer is difficult to have the metal flake fully covered and we found by two washers it is much better and easier.

The third option is to weld the cathode tab directly to the said outer casing on its inner flat area or bottom before the battery closed. This option needs much longer tab because if not, the tab could not reach the inner bottom of the outer casing for welding. The lengthy tab then needs to be folded into the battery inner space before the cell final closing. Insulation washer or washers could be applied on the welded flat area of the inner bottom of the outer casing, to prevent any metal from exposing to the electrolyte, to reduce the risk of battery short and also have longer cycle life. One washer is difficult to have the inner flat area of the outer casing fully covered and we found by two washers it is much better and easier.

DETAILED DESCRIPTION OF THE PREFERRED EMBODIMENTS

Figure 1:
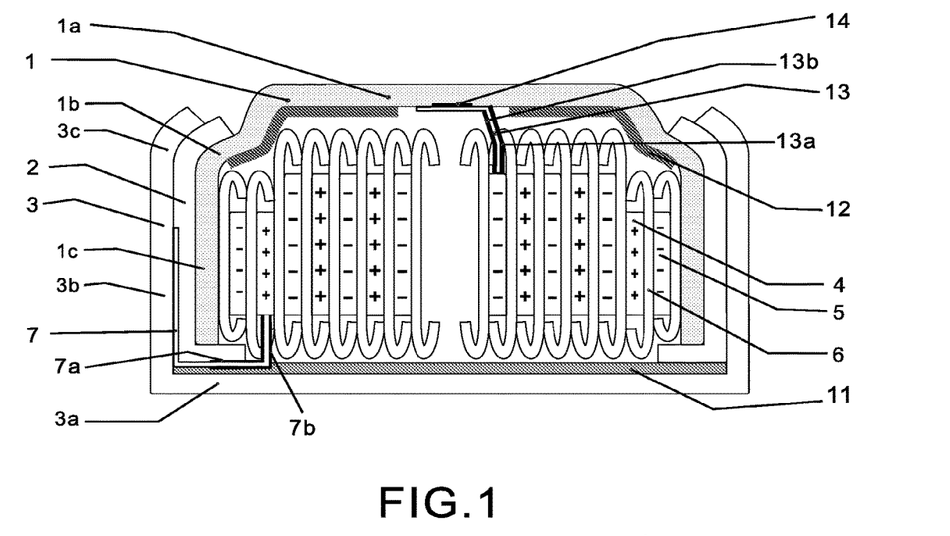
FIG. 1 is the cross-section view of the present invention.

FIG. 1 is the detailed illustration of the present invention embodiment. The battery inner casing 1 usually stainless steel, or nickel plated stainless steel, has at least one small flat area 1a, sidewall 1c vertical to 1a, and a shoulder 1b between them. The sidewall 1c is usually round and could be oval, for an oval shape button cell. The inner casing 1 is usually anode casing. The outer casing 3 usually stainless steel, or nickel plated stainless steel, also has a flat area 3a and vertical sidewall 3b, 3b is usually round and could be oval, for an oval shape button cell. The outer casing is usually cathode casing. The insulation gasket 2 usually comprising polypropylene coated with battery sealant is positioned between sidewall 1c and 3b, covering the opening end of inner gasket 1c by its footing rim, and the outer casing opening rim 3c is mechanically crimped to press the gasket firmly on the inner casing shoulder 1b to complete the seal of the battery.

Figure 8:
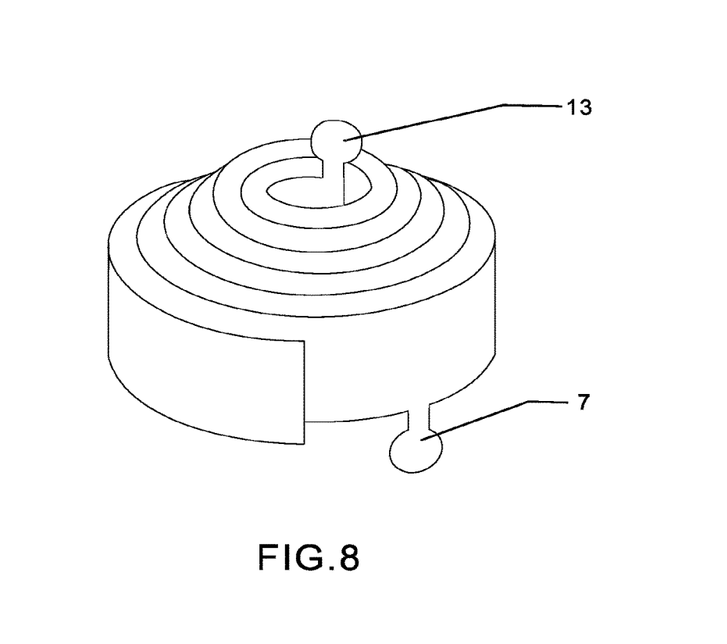
FIG. 8 is the illustration of the spiral wound electrodes roll of the present invention.

Inside the sealed housing the anode electrode 5 and cathode electrode 4 are spiral wound with separator 6 to be a round or oval roll as FIG. 8. The spiral drawing line in FIG. 8 represents multi-layers of electrodes and separators and just to show the profile of the roll not by exact proportion or detail. Said roll is inserted into inner casing 1 and its axis is vertical to the flat top 1a and bottom 3a of the casings, and parallel to the casing sidewalls. After the gasket 2 pre-coated with battery sealant is mounted to inner casing 1, electrolyte usually having $LiPF_6$ and other solvents is metering pumped into the roll in the inner casing 1 and wait till the electrolyte absorbed by the electrodes and separator before final battery closing. Some electrolyte may also spread to the free space in the battery housing.

Separator 6 usually comprising single layer PE membrane or laminated layers of PP/PE/PP micro-porous membrane at about 7 um to 25 um thickness, is positioned in between of the anode electrode 5 and cathode electrode 4 and wound together with the electrodes to form the roll of round or oval, for round or oval button cells. The width of separator 6 is greater than the width of the electrodes, and the wider separator is pushed down during battery assembly to be wrinkled at the edges as shown in most of the figures of present invention.

Figure 9:
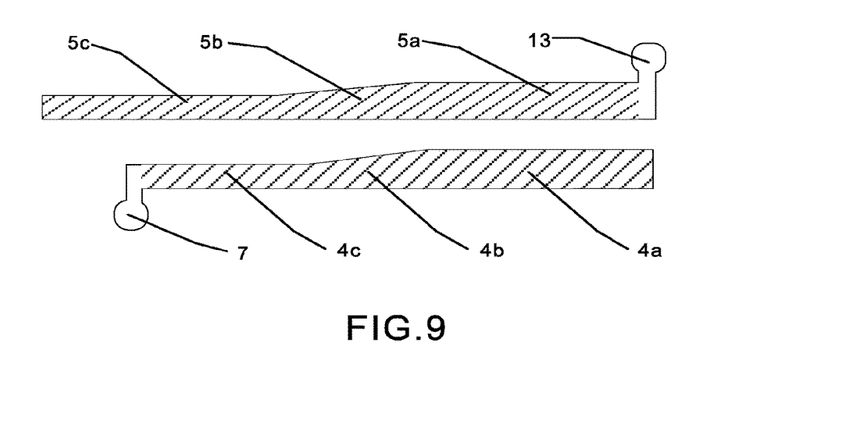
FIG. 9 is the electrodes configuration, tapered in width and with conductor tabs of the current collector foils.
Figure 12:
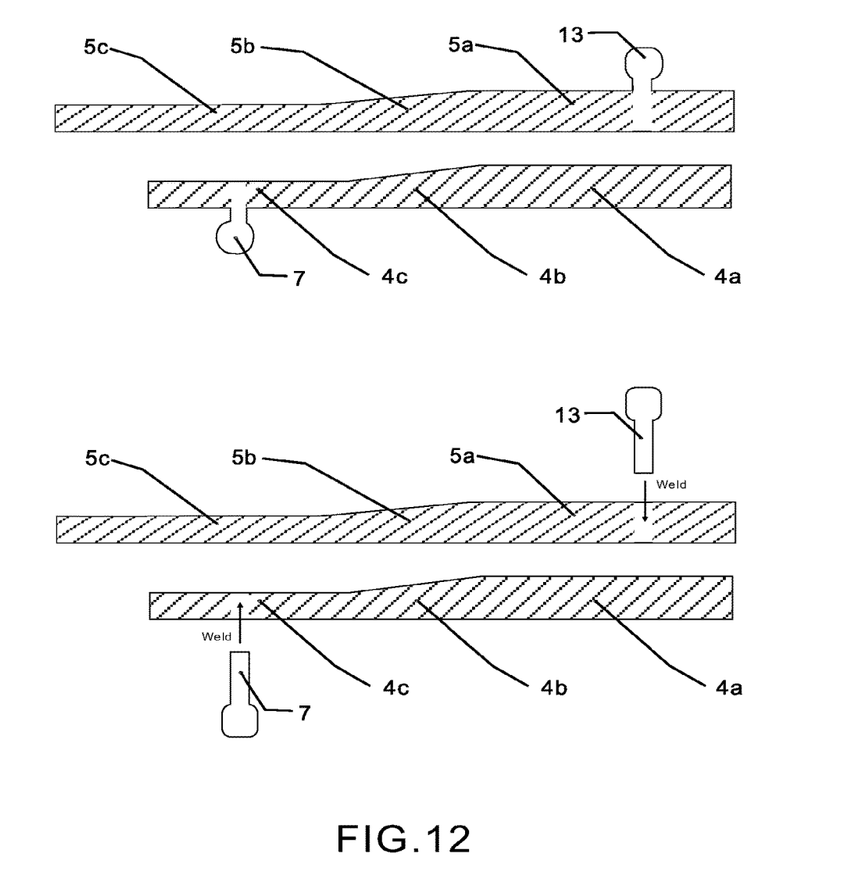
FIG. 12 is some other embodiments of the electrodes configuration.

The coated areas of electrodes are tapered in width as FIG. 9 with projected conductor tabs. The anode electrode 5 is made by a core layer of copper foil as current collector, both sides coated with graphite or other lithium intercalating material, and leaving the area of conductor tab 13 uncoated. The tab 13 is projected up from the wider end of electrode 5c and latterly projected from the spiral wound roll of the electrodes as FIG. 8. The tab 13 is spot welded with inner casing 1a at its center 14, to form a reliable connection of anode to the battery casing. The cathode electrode 4 is made by a core layer of aluminum foil as current collector, both sides coated with lithium intercalating materials such as $LiCoO_2$, $Li(Ni_{1/3}Mn_{1/3}Co_{1/3})O_2$, or mixtures thereof, and leave the area of conductor tab 7 uncoated. The tab 7 is projected to the other direction opposite to tab 13 at the narrower end of electrode 4c and latterly projected from the wound roll of the electrodes as FIG. 8. Conductor tab 7 can also be on another position of the electrode other than at the very end, as FIG. 12, and it can also be made by second party metal sheet or foil other than the current collector foil itself, to be welded with the uncoated area of the electrode. Conductor tab 13 can be made in the same way as FIG. 12.

As the inner casing 1 has a shoulder 1b for the seal of the battery, the inner height of the battery housing is taller at the center flat area 1a than at the shoulder area 1b. To fully utilize the inner space, the electrodes are designed to be in a tapered shape. For anode 5, 5a is wider and will be in the center of the roll after winding, 5b is tapered to be in the shoulder area 1b after winding, and 5c is narrower to be at the end of the roll after winding. For cathode 4 after winding, 4a in the center is wider to fit 1a, 4b is tapered to adapt 1b, and 4c is narrower at the end of the roll. The width difference between 5a/5c and 4a/4c is about 0.1 mm to 3 mm, more preferably about 0.2 mm to 1 mm.

Inventers of the present invention have found that if any metal of the cathode electrode or cathode casing is exposed to the electrolyte, then the battery is very easy to be short circuited. We believe this is due to the fact that the spiral wound roll is occupying most of the inner housing space and the electrode edges are so close to the housing casings, lithium ions trend to be concentrated on the naked metal surface where the electric potential is always the highest (cathode) or the lowest (anode) due to the fact that the casings are the first contacts to the outside circuit. Lithium ions which should be absorbed by the coated lithium-intercalating materials could make the battery short if they wrongly concentrated on the naked metal surfaces. This is especially severe on the cathode side while it is also observed on the anode side. Such exposure of the naked electrode metals or casings to the electrolyte should be prevented.

Figure 10:
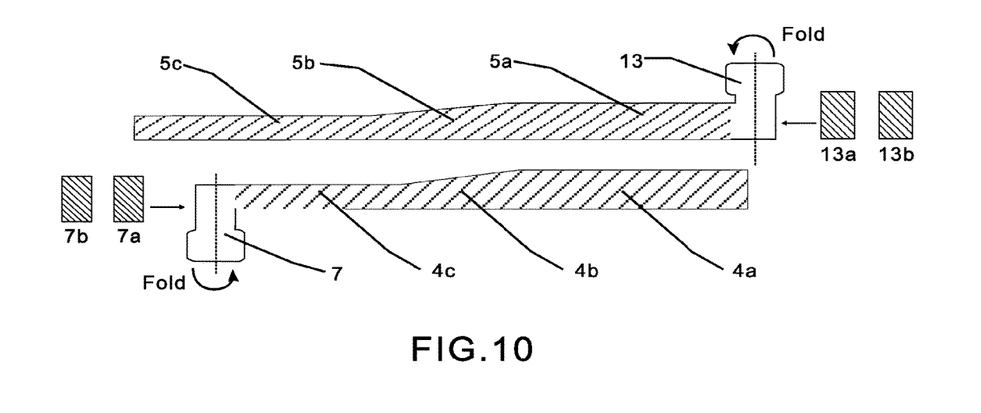
FIG. 10 is the electrodes configuration with wider conductor tabs which will at least be double folded.

To achieve this, insulation tapes could be applied to the electrodes as FIG. 9 and FIG. 10, like the tapes of 7a,7b and 13a, 13b. These tapes will be attached to the conductor tabs at theirs non-coated and non-connecting areas to the extent that no metal of the electrodes is exposed to the electrolyte. Usually in practice some small coated areas are also covered by these tapes. 7a is on the first side of the conductor tab 7 and 7b is on the second side. 13a is on the first side of conductor tab 13 and 13b is on the second side.

The anode casing or inner casing 1 has its inner surface at flat area 1a and shoulder area 1b to be covered by O ring shape washer 12 leaving a hole at the center before the spot welding of conductive tab 13 to the inner casing to form a solid connection 14. It is found that the inner sidewall 1c contacting separator could be exposed to electrolyte and has no negative effect to battery performance.

The cathode casing or the outer casing metal also needs to be covered from exposing to the electrolyte. The details will be described below with the different options of the connecting methods between cathode conductor tab 7 and the outer casing 3, as FIG. 1/FIG. 2, FIG. 3 and FIG. 4, they are the three different embodiments of the present invention.

Figure 2:
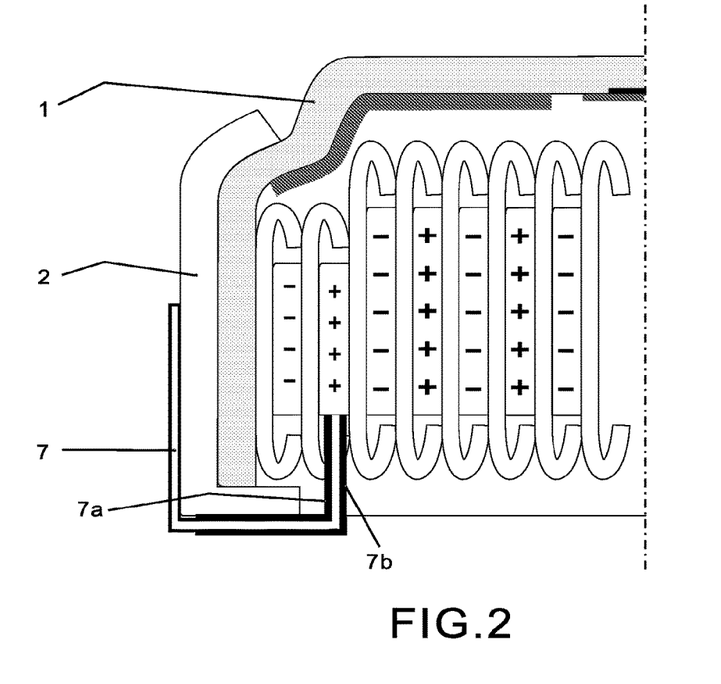
FIG. 2 is the enlarged view of the cathode conductor tab being out-up-bended.

The first embodiment is as per FIG. 1/FIG. 2. The cathode aluminum conductor tab 7 is firstly bended outward, across the insulation gasket over its footing rim, and then bended upward, along the outer sidewall of the insulation gasket 2 to about ⅕ to ⅘ of its full height, to have enough contacting area for the tab and cathode casing, while still leave room for the gasket to contact the cathode casing directly for a reliable seal. After filling the electrolyte to the spiral wound roll, the outer casing 3 is put onto the sub-assembly of FIG. 2 and by crimping the opening end 3c the battery is finally closed. The out-up-bended conductor tab 7 is squeezed between the inner sidewall of the outer casing 3b and the outer sidewall of the insulation gasket 2. The mechanical closing of the battery has enough force to have the tab 7 to contact the outer casing sidewall 3b very tightly for a good conducting of the electrons during charge and discharge. As the tab 7 is consisting of aluminum foil of only 0.012 mm thick, even after they are double or triple folded, they are still only 0.024 or 0.036 mm thick, which can be adapted by the slight deform of plastic gasket 2 which is usually 0.10 to 0.15 mm thick. So the sidewalls of the battery metal casings are not deformed by the insertion of the aluminum foil and then the battery still has a tight seal. A round insulation washer 11 could be pre-attached on the inner surface of the flat area 3a of the outer casing and it covers the casing metal completely from exposing any metal to the electrolyte, to prevent battery short and provide longer cycle life.

Figure 3:
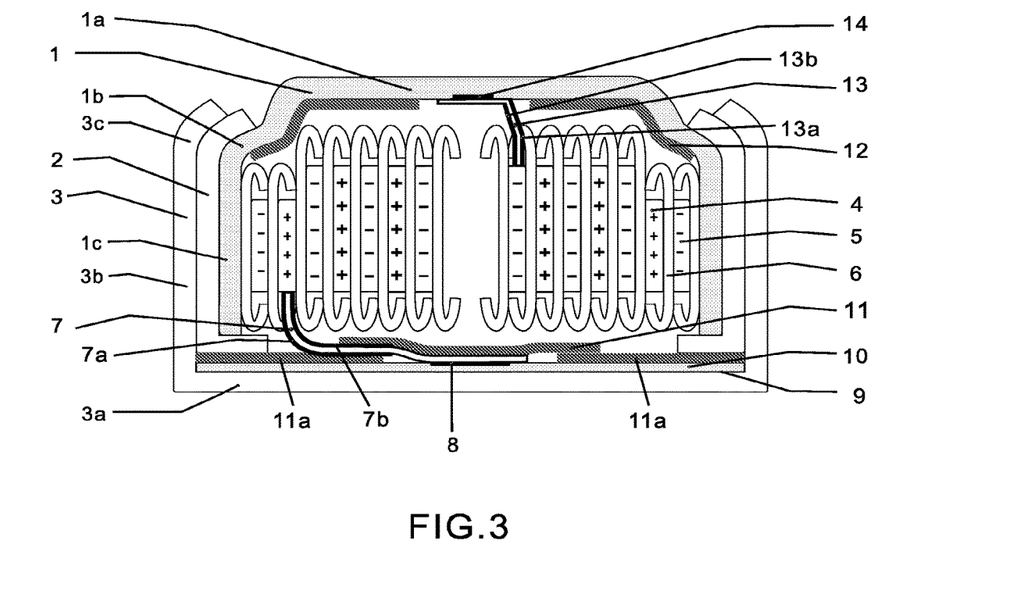
FIG. 3 is another embodiment of the present invention.

The second embodiment is as per FIG. 3. The cathode conductor tab 7 is ultrasonic welded with a metal flake 10, usually comprising aluminum, to form a reliable connection area 8, as FIG. 5. The flake 10 has the same diameter as the inner diameter of outer casing 3, and just fit into the bottom of 3a. The metal flake 10 is pre-attached with insulation washer 11a in O ring shape leaving the center for the welding of the conductor tab 7. After welding another insulation washer 11 which is round or oval is applied to fully cover the tab metal and the flake metal. The spiral wound roll is filled with electrolyte then the flake 10 is turned back down to cover the roll. The outer casing 3 is put onto them to close the battery by finally crimping the opening end 3c. When the battery is closed, the closing force through inner casing sidewall 1c and gasket 2 gives pressure at area 9 between flake 10 and casing bottom 3a, and forms a reliable contact or connecting of the cathode to the outer casing.

Figure 4:
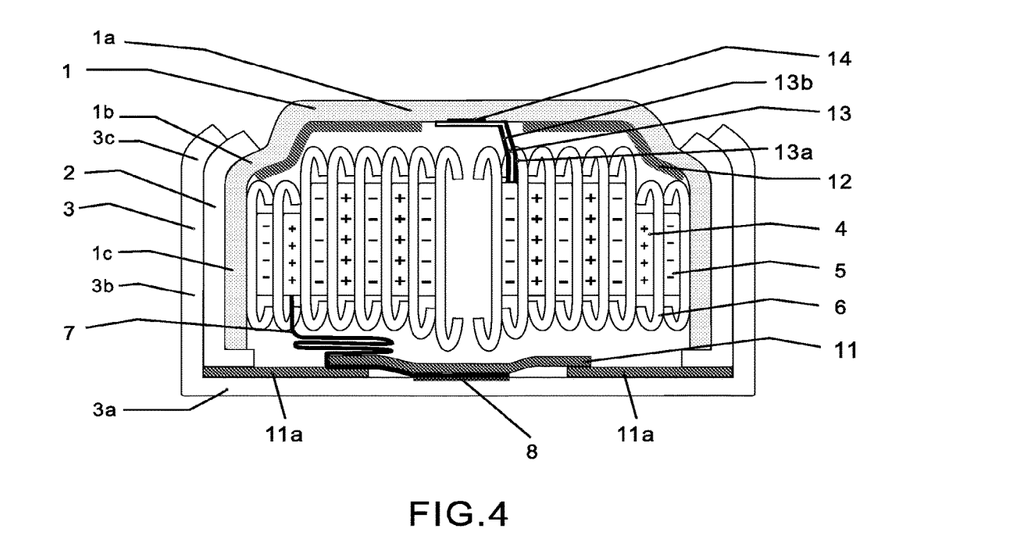
FIG. 4 is another embodiment of the present invention.

The third embodiment is as per FIG. 4, to weld the conductor tab 7 directly to the outer casing 3 at its inner bottom 3a. Insulation tapes 7a and 7b are not shown on FIG. 4 because of the picture scale is too small. This option needs much longer tab 7 because if not, the tab can not across the sidewall 3b to reach 3a at the bottom for ultrasonic welding. After welding the outer casing 3 is connected with the spiral wound roll by the lengthy tab 7 and it has to keep open before the electrolyte filled in. This brings risk of breaking the tab 7. After filling of electrolyte, the long tab 7 then needs to be bended for several times into the battery inner space before final closing of the battery. Insulation washer 11a in O ring shape is pre-attached before welding to the inner surface of bottom 3a leaving a hole in the middle for tab 7 to be ultrasonic welded to form a solid connection area 8. After welding another insulation washer 11 which is round or oval is applied to fully cover the tab metal and the casing metal preventing them from exposing to the electrolyte, to avoid battery short and provide longer cycle life.

The concern in prior art of the present invention about the corrosion of the cathode casing material or flake material is not an issue anymore herein because all the metals on the cathode side are fully covered with insulation tapes or washers. As long as the cathode metals do not contact the electrolyte, no corrosion would happen.

The "cathode" and "anode" definition could also be swapped in the embodiments of the present invention. As per FIG. 1, the inner casing 1 can be the cathode casing, outer casing 3 can be the anode casing, electrode 4 can be the anode, and electrode 5 can be the cathode. Those skilled in the art could see such swapped electrodes design is equivalent to above detailed explained embodiments.

EXAMPLE 1

As per FIG. 1, inventors of the present invention manufactured some lithium-ion rechargeable button cells size Z23 at diameter 7.8 mm height 5.3 mm as per the details disclosed in the above description.

Battery casings 1 and 3 are made by nickel plated stainless steel grade 316, 304 or 430, of 0.10 mm to 0.15 mm thick, preferably at 0.125 mm thick. The anode casing sidewall 1c is single wall. Gasket 2 is made by injected polypropylene at 0.06 mm to 0.15 mm thick, preferably at 0.12 mm thick.

Figure 11:
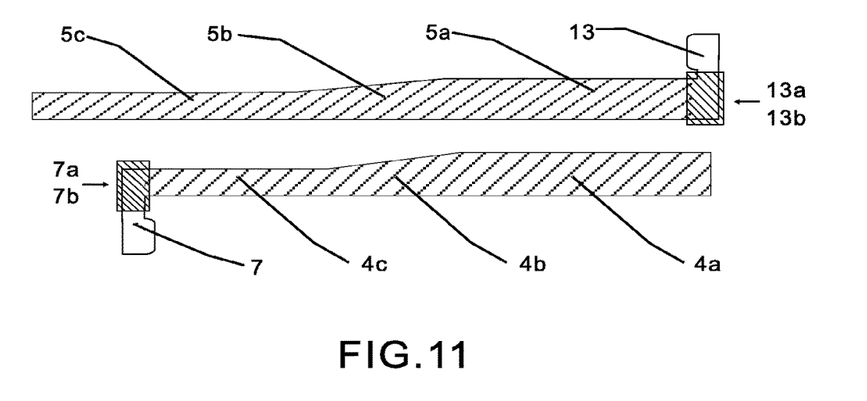
FIG. 11 is the electrodes with conductor tabs folded and partially covered with insulation tapes before winding.

Vacuum mix the cathode lithium-intercalating materials preferably $Li(Ni_{1/3}Mn_{1/3}Co_{1/3})O_2$ and other functional additives in NMP solvent thoroughly, and coat the slurry double sided on the aluminum foil usually 10 um to 25 um thick preferably 12 um thick, heat to dry the coated material and press it by a calendaring machine to get the desired thickness usually 0.1 mm to 0.2 mm. The coating is not on full area of the aluminum foil leaving a blank area uncoated for the battery tab 7. Then the electrode is cut by punching machine or preferably by laser cutting machine to be desired figuration as FIG. 10. Anode electrode is made in the similar way except the coating lithium-intercalating material is graphite and the current collector metal foil is copper at 5 um to 12 um thick most preferably at 6 um. Double fold the conductor tab 7 and 13 and then attach the insulation tapes 7a, 7b and 13a, 13b at both sides of the metal foil respectively and leave the end areas of connecting metal naked as FIG. 11.

Both electrodes 4 and 5 are spiral wound on winding machine together with separator 6, usually 7 um to 25 um thick PE or PP/PE/PP laminated microspores membrane, preferably 12 um. The separator 6 is about 0.5 mm to 1.5 mm wider than the electrodes 4 and 5 to prevent short. The finished wound roll is as FIG. 8 with two conductor tabs projected. Bend and press down the anode tab 13 on top of the winding hole and insert the roll into anode casing 1 wherein a ring-like insulation washer 12 is pre-attached. Spot weld the tab 13 on casing 1 by insert the welding pin into the winding hole. Put the gasket 2 pre-coated with battery sealant onto the outside surface of anode casing 1 till the footing rim touching the opening edge of 1c.

Bend the cathode conductor tab 7 firstly outward across the footing rim of gasket 2, and then bend the conductor tab 7 upward along the sidewall of the gasket 2, to about ½ of the gasket sidewall full height. The naked metal of tab 7 is now attached to the outer sidewall of the gasket 2 by the pre-coated sealant or added glue. The insulation tapes 7a and 7b are extended to the footing rim of the gasket 2 covering the other part of conductor tab 7 not exposed to the electrolyte.

Such sub-assembly is put into vacuum oven to dry for 24 hours to eliminate water. Then put it into dry glove box wherein the relative humidity of the air is less than 1% to fill electrolyte usually $LiPF_6$ in solvents by a metering pump. After the electrolyte being absorbed by the spiral wound roll then put the outer casing 3 pre-attached with insulation washer 11 covering its inner flat area 3a onto the sub-assembly to close the battery in a first step. Then put the battery into the closing machine which also in the dry glove box to have the battery outer casing opening 3 crimped together with gasket against the shoulder 1b of inner casing 1 to finally seal the battery.

Then the sealed battery will be aged for at least one day before further activation or formation by slow charging and then to be cycled at least twice to measure the capacity. The capacity is found to be at 24 mAh at 5 mA discharge current, average voltage 3.7V to end voltage 2.75V, after being fully charged to 4.2V. Total energy is 89 mWh and volumetric energy density is 345 Wh/L. Remaining capacity at 80% of initial capacity is found after 600 to 1000 cycles typically at 800 cycles. Cycle regime is at 12 mA constant-current constant-voltage charge to 4.2V and discharge at 12 mA to 3.0V, 25 to 30 Celsius.

Other battery sizes like Z22 at diameter 7.8 mm height 4.0 mm, Z21 at diameter 7.8 mm height 3.5 mm, and Z11 at diameter 6.4 mm height 4.0 mm also have been made in above method, they all have similar electrical performances as Z23 described above while capacity is at 16 mAh, 13 mAh, and 9.5 mAh respectively.

EXAMPLE 2

Figure 5:
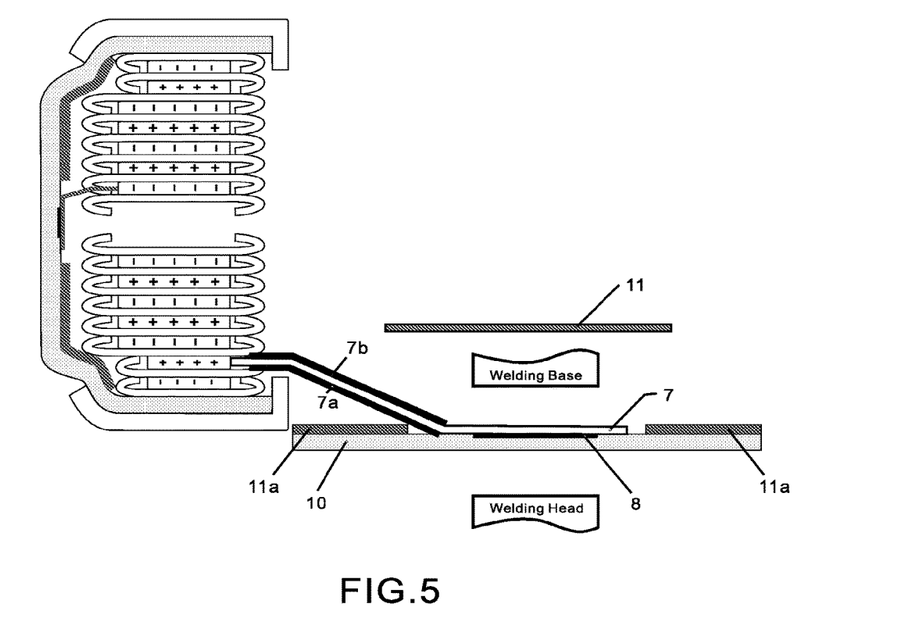
FIG. 5 is the illustration of the cathode welding process of the FIG. 3 embodiment.
Figure 6:
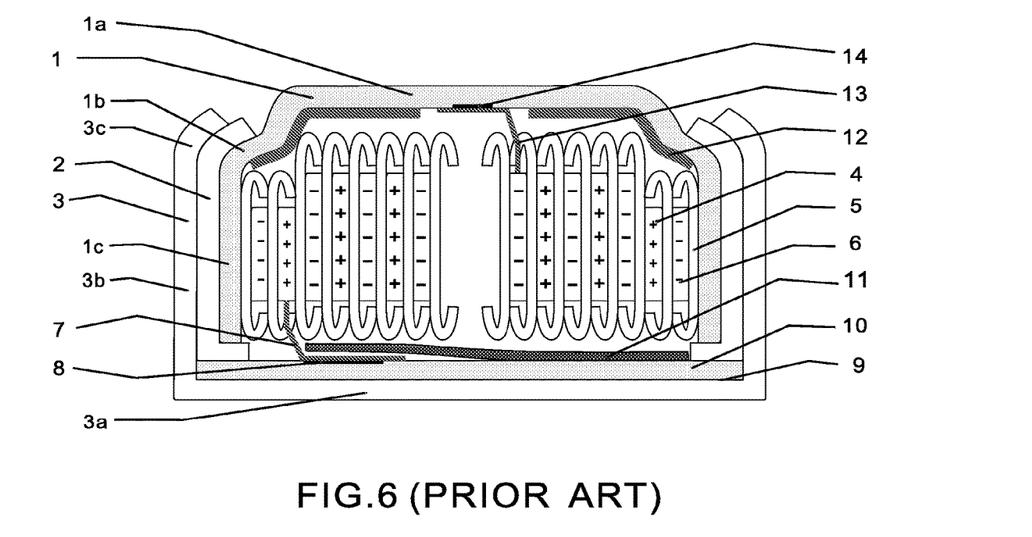
FIG. 6 is the cross-section view of the prior art embodiment of FIG. 3.
Figure 7:
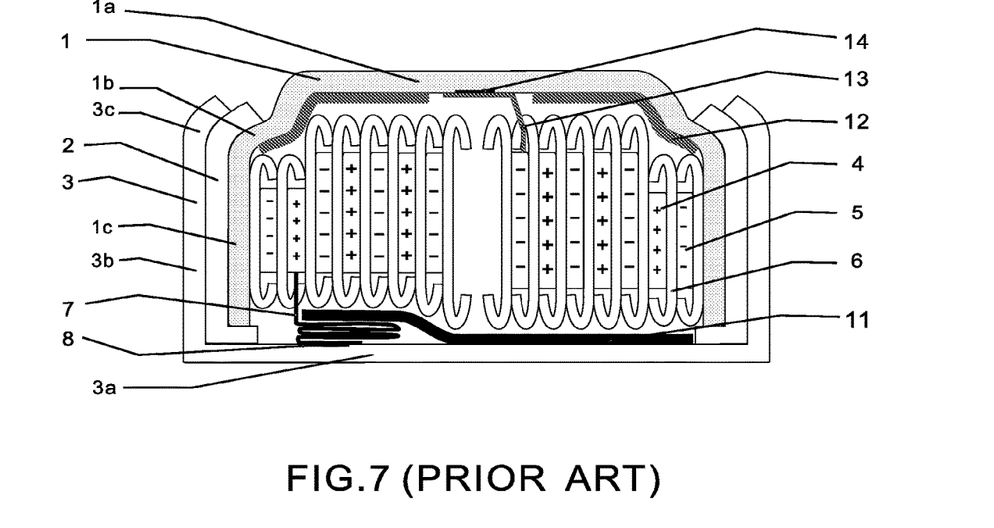
FIG. 7 is the cross-section view of the prior art embodiment of FIG. 4.

As per FIG. 3, most of the parts, materials and procedures are the same as example 1, except that the cathode tab 7 is welded to a round metal flake 10 usually aluminum flake at 0.05 mm thick, as FIG. 5. Insulation washer 11a is a O ring shape adhesive tape, to be attached to flake 10 before ultrasonic welding, leaving the center metal exposed and then welded with conductor tab 7. After welding insulation washer 11 usually round is attached to the welding area to have all the naked metals covered. After the electrolyte being filled, the flake 10 is then turned down to cover the spiral wound roll and then the outer casing 3 is put onto this sub-assembly then the battery is finally crimped and sealed.

The battery made in this example has the similar performance as example 1, except that an extra aluminum flake 10 welded to conductor tab 7 and it brings risk of breaking the tab 7 at different assembly steps. It also occupies about 0.05 mm thickness of the battery inside space which means about 1%-2% capacity lower than example 1 for Z23 size battery.

EXAMPLE 3

As per FIG. 4, most of the parts, materials and procedures are the same as example 1, except that the cathode tab 7 is much longer and welded directly to the outer casing inner flat area 3a. The longer tab 7 can reach 3a by crossing the sidewall 3b down and then ultrasonic welded with 3a at area 8. Insulation washer 11a is a O ring shape adhesive tape, to be attached to outer casing bottom 3a before ultrasonic welding, leaving the center metal exposed and then welded with conductor tab 7. After welding insulation washer 11 usually round is attached to the welding area to have all the naked metals covered. The long neck of tab 7 will have to hold the outer casing 3 together with the spiral wound roll during all the steps afterward. After the electrolyte being filled, the outer casing 3 is then turned back from aside to cover the sub-assembly while the lengthy tab 7 must be carefully bended for several times to be contained inside of the battery housing, and then the battery is finally crimped and sealed.

The battery made in this example has the similar performance as example 1 and example 2, except that the lengthy tab 7 brings high risk of breaking of itself at different assembly steps, and the production yield is low. The bended tab 7 also occupies some inner space of the battery and hence the capacity is also lower.

It will be apparent to those skilled in the art that various modifications and variation can be made in the present invention without departing from the spirit or scope of the present invention. Thus, it is intended that the present invention covers the modifications and variations of this invention provided they come within the scope of the appended claims and their equivalents.

We claim:

1. A rechargeable lithium ion button cell battery comprising:
   a sealed housing comprising an inner casing and an outer casing, both casings having at least one flat area as top or bottom of the battery, a round or oval sidewall vertically formed to the flat area, and a round or oval insulation gasket having a footing rim and positioning between the sidewalls, the footing rim covering an opening end of an inner casing sidewall; an outer casing sidewall is crimped together with the gasket against the inner casing to seal the battery, wherein the housing contains electrolyte;
   a first electrode and a second electrode inside the sealed housing being spiral wound with a separator to be a round or oval roll, wherein a roll axis is vertical to the flat areas of the casings;
   wherein both electrodes have one small area not coated with active materials, and exposed metals at the areas act as conductor tabs to connect the electrodes with the casings respectively;
   wherein the electrodes are tapered in width on coated areas thereof, wider at a center of the spiral wound roll and narrower at a rim of the spiral wound roll, and the width of the wider end is 0.1 mm to 3 mm greater than the width of the narrower end.

2. The battery of claim 1, wherein the width of the wider end is 0.2 mm to 1 mm greater than the width of the narrower end.

3. The battery of claim 1, wherein the conductor tabs are extensions of a same current collector metal foil of the respectively electrodes.

4. The battery of claim 1, wherein at least one of the conductor tabs is a second party metal sheet welded to a current collector metal foil on an uncoated area thereof.

5. A rechargeable lithium ion button cell battery comprising:
   a sealed housing comprising an inner casing and an outer casing, both casings having at least one flat area as top or bottom of the battery, a round or oval sidewall vertically formed to the flat area, and a round or oval insulation gasket having a footing rim and positioning between the sidewalls, the footing rim covering an opening end of an inner casing sidewall; an outer casing sidewall is crimped together with the gasket against the inner casing to seal the battery, wherein the housing contains electrolyte;
   a first electrode and a second electrode inside the sealed housing being spiral wound with a separator to be a round or oval roll, wherein a roll axis is vertical to the flat areas of the casings;
   wherein both electrodes have one small area not coated with active materials, and exposed metals at the areas act as conductor tabs to connect the electrodes with the casings respectively;
   wherein the first electrode is connected to the outer casing by positioning a conductor tab of the first electrode between the inner sidewall of the outer casing and the outer sidewall of the gasket.

6. The battery of claim 5, wherein the second electrode is welded on a conductor tab thereof to the inner casing.

7. The battery of claim 5, wherein an insulation washer is attached to an inner flat area of the outer casing and the washer has the inner flat area to be covered to an extent that no metal of the outer casing is exposed to the electrolyte.

8. The battery of claim 5, wherein a first electrode conductor tab is covered with an insulation tape at non-coated and non-connecting areas of the first electrode conductor tab to an extent that no metal of the first electrode is exposed to the electrolyte.

9. The battery of claim 5, wherein a second electrode conductor tab is covered with an insulation tape at non-coated and non-welding areas of the second electrode conductor tab to an extent that no metal of the second electrode is exposed to the electrolyte.

10. A rechargeable lithium ion button cell battery comprising:
    a sealed housing comprising an inner casing and an outer casing, both casings having at least one flat area as top or bottom of the battery, a round or oval sidewall vertically formed to the flat area, and a round or oval insulation gasket having a footing rim and positioning between the sidewalls, the footing rim covering an opening end of an inner casing sidewall; an outer casing sidewall is crimped together with the gasket against the inner casing to seal the battery, wherein the housing contains electrolyte;
    a first electrode and a second electrode inside the sealed housing being spiral wound with a separator to be a round or oval roll, wherein a roll axis is vertical to the flat areas of the casings;

wherein both electrodes have one small area not coated with active materials, and exposed metals at the areas act as conductor tabs to connect the electrodes with the casings respectively;

wherein a first electrode conductor tab is welded with a round or oval metal flake, and the flake is positioned between an inner flat area of the outer casing and the gasket footing rim.

11. The battery of claim 10, wherein the second electrode is welded on the conductor tab thereof to the inner casing.

12. The battery of claim 10, wherein a first O ring shape insulation washer is attached to the metal flake before welding, and a second round insulation washer is attached to the metal flake after the welding of the first electrode, and a top surface of the metal flake connecting with the first electrode is fully insulated from electrolyte.

13. The battery of claim 10, wherein a first electrode conductor tab is covered with an insulation tape at non-coated and non-connecting areas of the first electrode conductor tab to an extent that no metal of the first electrode is exposed to the electrolyte.

14. The battery of claim 10, wherein a second electrode conductor tab is covered with an insulation tape at non-coated and non-welding areas of the second electrode conductor tab to an extent that no metal of the second electrode is exposed to the electrolyte.

15. A rechargeable lithium ion button cell battery comprising:

a sealed housing comprising an inner casing and an outer casing, both casings having at least one flat area as top or bottom of the battery, a round or oval sidewall vertically formed to the flat area, and a round or oval insulation gasket having a footing rim and positioning between the sidewalls, the footing rim covering an opening end of an inner casing sidewall; an outer casing sidewall is crimped together with the gasket against the inner casing to seal the battery, wherein the housing contains electrolyte;

a first electrode and a second electrode inside the sealed housing being spiral wound with a separator to be a round or oval roll, wherein a roll axis is vertical to the flat areas of the casings;

wherein both electrodes have one small area not coated with active materials, and exposed metals at the areas act as conductor tabs to connect the electrodes with the casings respectively;

wherein a first electrode conductor tab is welded to an inner flat area of the outer casing before the cell battery being sealed.

16. The battery of claim 15, wherein the second electrode is welded on a conductor tab thereof to the inner casing.

17. The battery of claim 15, wherein a first O ring shape insulation washer is attached to an inner flat area of the outer casing before welding, and a second round insulation washer is attached to the inner flat area of the outer casing after a welding of the first electrode, and a surface of the inner flat area of the outer casing is fully insulated from electrolyte.

18. The battery of claim 15, wherein the first electrode conductor tab is covered with an insulation tape at non-coated and non-connecting areas of the first electrode conductor tab to an extent that no metal of the first electrode is exposed to the electrolyte.

19. The battery of claim 15, wherein a second electrode conductor tab is covered with an insulation tape at non-coated and non-welding areas of the second electrode conductor tab to an extent that no metal of the second electrode is exposed to the electrolyte.

20. A rechargeable lithium ion button cell battery comprising:

a sealed housing comprising an inner casing and an outer casing, both casings having at least one flat area as top or bottom of the battery, a round or oval sidewall vertically formed to the flat area, and a round or oval insulation gasket having a footing rim and positioning between the sidewalls, the footing rim covering an opening end of an inner casing sidewall; an outer casing sidewall is crimped together with the gasket against the inner casing to seal the battery, wherein the housing contains electrolyte;

a first electrode and a second electrode inside the sealed housing being spiral wound with a separator to be a round or oval roll, wherein a roll axis is vertical to the flat areas of the casings;

wherein both electrodes have one small area not coated with active materials, and exposed metals at the areas act as conductor tabs to connect the electrodes with the casings respectively;

wherein at least one of the conductor tabs is at least double folded.

21. The battery of claim 20, wherein the conductor tabs arc extensions of a same current collector metal foil of the respective electrodes.

22. The battery of claim 20, wherein at least one of the conductor tabs is a second party metal sheet welded to a current collector metal foil on an uncoated area thereof.

23. The battery of claim 20, wherein a first electrode conductor tab is covered with an insulation tape at non-coated and non-connecting areas of the first electrode conductor tab to an extent that no metal of the first electrode is exposed to the electrolyte.

24. The battery of claim 20, wherein a second electrode conductor tab is covered with an insulation tape at non-coated and non-welding areas of the second electrode conductor tab to an extent that no metal of the second electrode is exposed to the electrolyte.

* * * * *